May 20, 1952    T. F. WORTH    2,597,694
DYNAMOELECTRIC MACHINE END SHIELD AND BEARING HOUSING
Filed Feb. 8, 1950    2 SHEETS—SHEET 1
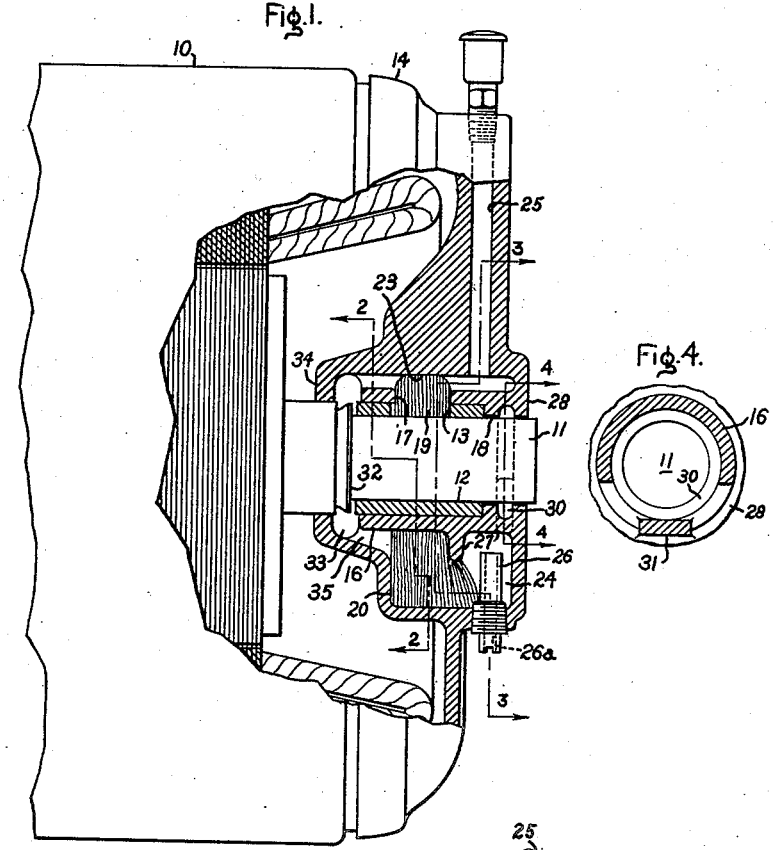
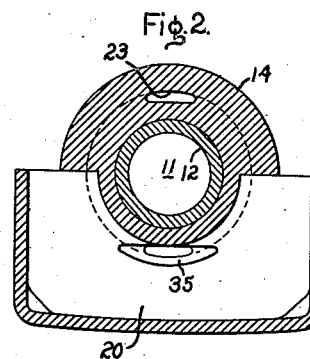
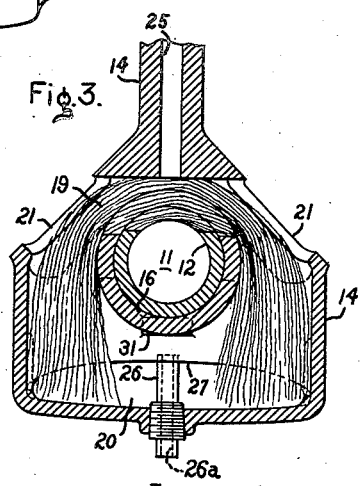
Inventor:
Thomas F. Worth,
by Ernest F. Britton
His Attorney.

May 20, 1952   T. F. WORTH   2,597,694
DYNAMOELECTRIC MACHINE END SHIELD AND BEARING HOUSING
Filed Feb. 8, 1950   2 SHEETS—SHEET 2
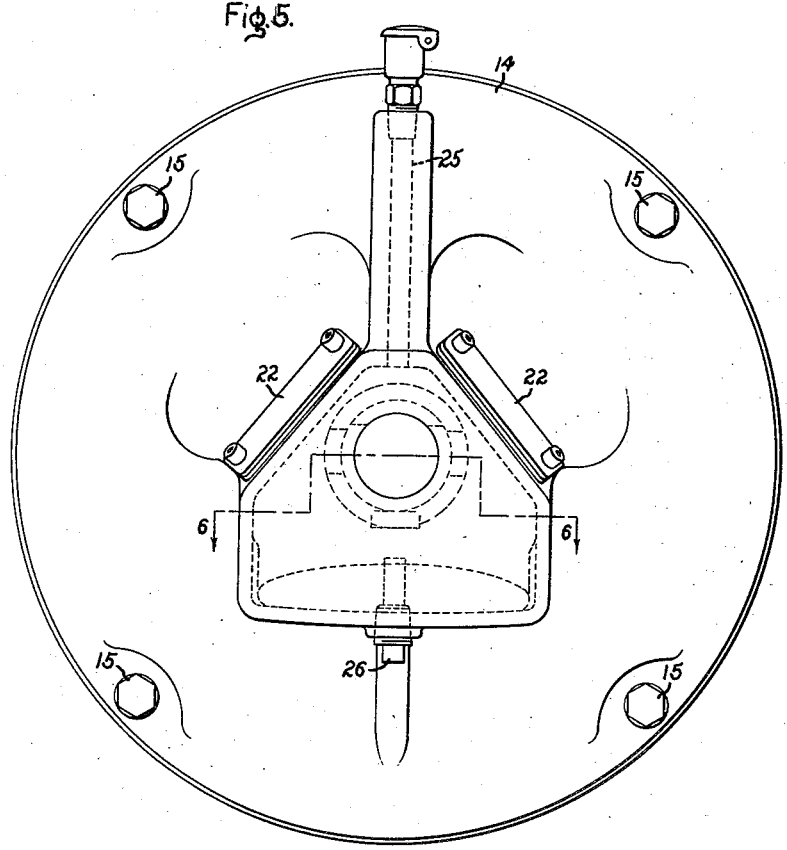
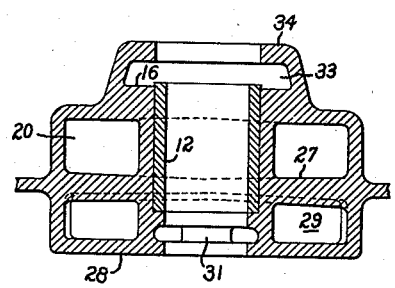
Inventor:
Thomas F. Worth,
by Ernest C. Britton
His Attorney.

Patented May 20, 1952

2,597,694

UNITED STATES PATENT OFFICE 2,597,694

DYNAMOELECTRIC MACHINE END SHIELD AND BEARING HOUSING

Thomas F. Worth, Lynn, Mass., assignor to General Electric Company, a corporation of New York Application February 8, 1950, Serial No. 143,093

4 Claims. (Cl. 308—132)

My invention relates to improvements in dynamoelectric machine end shields and bearing housings. The invention has particular significance in connection with oil deflection arrangements in a sleeve bearing housing for a so-called loom motor.

Dynamoelectric machines of certain types, such as loom motors, are often subjected to tremendous vibrations and shock which make impractical the use of oil rings or ball bearings, so that the bearings of such machines are conventionally of the sleeve bearing type and lubricated by waste packing which contacts the shaft and also extends into an oil filled chamber to draw oil therefrom by capillary attraction. Heretofore, the packing, or other form of oil wick, in such a bearing housing has in many applications interfered with the free flow of oil, for example, whenever oil is added from the outside. In order to add oil to such an assembly, it has often been thought necessary to first saturate the wick, but this causes flooding of the housing with attendant leakage of oil along the shaft. Thus, some of the prior art arrangements have been objectionable in that they allow or cause oil to back up along the machine shaft and eventually reach external parts which are thereupon rendered unsightly or reach interior parts (such as electrical windings) which are then deleteriously affected. Further, such wick saturation is a lengthy process (often taking as long as twenty minutes) and quite apt to give inexperienced personnel a false indication of adequate oil addition. At the same time, there is always the problem of providing adequate back-up support for the bearing surfaces while allowing maximum lubricant flow to such surfaces.

It is an object of the present invention to provide simple and inexpensive means for overcoming the above-mentioned difficulties.

Another object of the invention is to provide an integrally formed dynamoelectric machine end shield and bearing housing of the type having a waste packing chamber and an oil reservoir separate therefrom together with means for effectively controlling the level of oil in said reservoir and preventing the escape of oil at disadvantageous locations.

A further object of the present invention is to provide a waste packed bearing arrangement which permits adequate contact between waste and journal surfaces and at the same time provides practically complete circumferential and thrust bearing backup support.

In the illustrated embodiment, the means employed in meeting these and other objects comprises a cast iron backed bronze bearing lining with the cast iron backing being formed as an integral part of an end shield for a motor adapted to have a shaft journalled in the lining. The lining and backing are provided with windows located above the shaft and through which a wick extends to contact the shaft and the two ends of the wick extend down on each side into a wick receiving chamber which communicates with an oil reservoir, but a barrier extends between the wick chamber and the reservoir to substantially keep the wick out of the reservoir. Oil is introduced (through a fill pipe at the top of the end shield and axially away from the wick location), passing around the lining and backing to the reservoir in which the oil level is controlled by an overflow pipe. With this construction, the oil does not have to saturate the wick before it goes into the reservoir and the wick will not block the overflow. Meanwhile, the backing wall, the wick, the barrier and the overflow cooperate to prevent flooding of the housing.

Other objects and advantages will become apparent and my invention will be better understood from consideration of the following description taken in connection with the accompanying drawing in which Fig. 1 is a longitudinal elevation (partly broken away) of an end of a loom motor having a waste packed bearing, packing chamber and oil reservoir; Fig. 2 is a cross-sectional elevation taken at various axial points as indicated by the line 2—2 of Fig. 1, and particularly showing longitudinal oil passages adjacent the axially inner side of the waste packing; Fig. 3 is a cross-sectional elevation taken on the line 3—3 of Fig. 1 and showing the waste packing which is not shown in Fig. 2; Fig. 4 is a partial cross-sectional view taken on the line 4—4 of Fig. 1, and particularly showing means for draining oil which has leaked along the shaft; Fig. 5 is an end elevation of the end shield of Fig. 1 and showing in place window covers 22 (which are not shown in Fig. 3); and Fig. 6 is a sectional view looking down along the line 6—6 of Fig. 5.

In Fig. 1, 10 represents the outer frame of a motor having a steel shaft 11 supported by having a portion thereof journalled in a sleeve type bearing lining 12 which is made of bronze or like material and provided at its top with a window opening 13. The bearing lining 12 is supported by an end shield 14 which may be secured to the motor outer frame 10 by a plurality of bolts 15, as indicated in Fig. 5. The arrangement at the opposite end of the machine may be substantially the same as that shown and each end shield 14 may, as shown, be an integral casting with a center portion 16 accurately bored out to retain the bronze lining 12 by a press fit made before assembly of shield to outer frame and bearing lining around shaft. This bored portion 16 of the casting 14 is provided with a window 17 which corresponds to the window opening 13 of the lining. These windows are not coextensive with the length of the lining so that the backing-up portion 16 of casting 14 provides 360° circumferential back-up for the lining 12 at each axial end of the windows and approximately 260° circumferential back-up adjacent the radial sides thereof. The lining back-up portion 16 of the end shield casting is also provided with an inner flange portion 18 which acts as an axial thrust back-up for the bearing lining around the entire circumference.

As shown in Figs. 1 and 3, an oil wick comprising waste packing 19 is placed through the windows to contact the top of the shaft adjacent the mating surfaces between the shaft and the lining, with the ends of the packing extending down into a wick receiving chamber 20 located within the casting 14 beneath the shaft 11, lining 12 and back-up portion 16. In order to facilitate placing waste across the lining window and evening up its ends, I have provided two windows 21 located at opposite sides of the top of the bearing housing portion of the casting and adjacent the wick as shown in Fig. 3. Preferably, these windows are provided with covers 22 as indicated in Fig. 5. By placing these window openings at the sides of (rather than immediately above) the lining window, one upper wall 23 of the casting 14 may be made to fall immediately above the lining window 13 to assure that the waste will be maintained in intimate contact with the shaft.

The main lubrication chamber is divided into two sections, one containing the wick 19 and designated wick receiving chamber 20, and the other an open reservoir 24 into which oil can be added, as by a fill pipe 25, in sufficient amount to maintain the proper lubricant level. An overflow pipe 26 is provided with a center hole 26a permitting the escape of the lubricant when the predetermined proper level has been reached. In order that oil may be readily added or drawn off without the passage of oil being impeded by the presence of the wick, the fill pipe 25 and overflow stand pipe 26 are axially displaced from the waste packing 19, and a baffle 27 (see Figs. 1 and 3) is provided to substantially separate the wick receiving chamber 20 and the oil reservoir 24, and to keep the free (i. e., unwindowed) ends of the wick out of the latter.

When oil is introduced through fill pipe 25, it will be blocked (by the wick 19) from passing toward the interior of the motor where it might do damage to the motor windings. Oil thus introduced passes around the annular deflector formed by the outer circumference of back-up portion 16 and flows on either side of this cylindrical wall between the waste and an axially outermost end 28 of the housing, around through openings 29 (Fig. 6) into the bottom of the reservoir cavity 24 in which the overflow pipe 26 is provided to control the top limit of oil level in the reservoir.

Oil taken up by the waste and fed therefrom onto the shaft may go between the lining and the shaft toward the outside end of the machine, but it will eventually reach an inner peripheral cavity 30 formed between flange 18 and end 28 and then drop down into reservoir 24. Meanwhile, it is prevented from dropping into the overflow opening by a small bar-like section 31 (see Figs. 3, 4 and 6). Oil taken up by the waste and fed therefrom onto the shaft may go between the lining and the shaft toward the interior of the motor, but it is prevented from actually reaching the motor interior because it will first reach a shoulder 32 provided on the shaft and operating within an inner peripheral cavity or annular groove 33 provided between the back-up portion 16 and an inner end 34 of the end shield, and thus the oil will be caused to drop down around the shaft and down a sloping passageway 35 back to the wick and oil chambers.

In operation, the construction described not only presents the advantages of allowing oil to be put directly into the reservoir and of preventing the wicking from clogging up the overflow, but the advantage of the prevention of oil leakage along the shaft past the end shield in either direction or directly through the overflow when filling. However, the overflow will allow air relief when filling, and will allow during operation a breathing action which assists in preventing leakage along the shaft. Meanwhile, the bearing lining is adequately backed up not only circumferentially but axially in both directions (if identical but oppositely disposed end shields are used on the two ends) and the waste may be readily replaced, evened up and held securely in place. A serious disadvantage of many prior art constructions (in which quite a period of time is required for oil to pass through the waste so that during filling there may be a large volume of oil above the wick when the predetermined reservoir level has been reached with a consequent probability of later flooding) is completely obviated by the invention which does not require wick saturation during filling.

While I have illustrated and described a particular embodiment of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An end shield for a dynamoelectric machine having a shaft, said end shield having an integrally formed bearing housing, said housing including an inner annular bearing support, a sleeve bearing arranged within said bearing support and adapted to support said shaft, two axially spaced apart chambers within said housing and substantially surrounding said annular bearing support one comprising a wick receiving chamber and one an oil reservoir chamber, said sleeve bearing having a window at the top thereof, said bearing support having a substantially co-extensive window therein, an oil wick arranged to cross said shaft through said windows and extend around both sides of said support and into said wick receiving chamber, communicating means between said wick receiving chamber and oil reservoir, an oil overflow stand pipe located in said reservoir chamber and leading out of said housing, and means including a barrier between said axially spaced chambers for keeping said wick from blocking said stand pipe.

2. An integrally formed dynamoelectric machine end shield and bearing housing, said housing having a waste packing chamber portion and an oil reservoir portion communicating with said chamber portion and axially outwardly spaced therefrom, a sleeve of bearing metal arranged within said housing, said housing having an inner annular portion adapted to circumferentially and axially back-up said sleeve, said sleeve and said back-up portion being provided with cooperating windows located within said packing chamber portion and adapted to receive waste packing, said packing chamber portion having two diagonally disposed top windows communicating with said waste packing chamber portion and for inserting waste packing therein, said top windows being separated by a top surface of said housing arranged above said lining and support windows for maintaining said waste under proper pressure on said shaft at said lining window, an oil fill pipe arranged at the top of said housing and communicating with said oil reservoir portion around said back-up portion, an oil overflow stand pipe located within said oil reservoir portion, means including a barrier designed into said end shield and housing for preventing oil added through said fill pipe from dropping into said overflow stand pipe, and means for keeping waste packed into said waste packing chamber portion from blocking the opening in said overflow stand pipe, said last means including a semi-barrier rib forming integrally with said end shield and housing and partially separating said communicating portions.

3. An integrally formed dynamoelectric machine end shield and bearing housing, said housing having a waste packing chamber and an oil reservoir communicating with said chamber and axially outwardly spaced therefrom, a sleeve of bearing metal arranged within said housing, said housing being provided with a inner annular portion adapted to circumferentially and axially back-up said sleeve, said sleeve and said back-up portion being provided with cooperating windows adapted to receive waste packing, said housing having two diagonally disposed top windows communicating with said waste packing chamber and for inserting waste packing therein, said top windows being separated by a top surface of said housing arranged above said lining and support windows for maintaining said waste under proper pressure on said shaft at said lining window, an oil fill pipe arranged at the top of said housing and communicating with said oil reservoir around said back-up portion, an oil overflow stand pipe located within said oil reservoir, means for keeping waste packed into said waste packing chamber from blocking the opening in said overflow stand pipe, said last means including a semi-barrier rib forming integrally with said end shield and housing, means including a peripheral groove opening radially inward at each end of said housing for returning excessive oil at the bearing surfaces to said wick receiving and said oil reservoir chambers, and means including a barrier located adjacent the one of said grooves adjacent said overflow stand pipe and for preventing oil thus returned from entering said overflow stand pipe.

4. The combination in a dynamoelectric machine having a shaft, of at least one sleeve bearing lining in which said shaft is journalled, and an integrally cast end shield and sleeve bearing housing, said housing having an integrally formed lining backing portion providing circumferential and axial back-up support for said lining, said backing portion and said lining each having a window, said windows being substantially coextensive with each other and located above said shaft, a wick of packing material extending over said shaft through said windows and having free ends extending around said backing portion and therebelow, said housing having a wick receiving chamber extending substantially below said backing portion and for receiving said free ends of said wick, said housing having an additional oil reservoir chamber communicating with and axially spaced from said wick receiving chamber, semi-barrier means interposed between said wick receiving chamber and said reservoir chamber for keeping said wick out of said reservoir chamber, means for filling said oil reservoir, and overflow means associated with said reservoir to prevent the flooding of said housing.

THOMAS F. WORTH.

REFERENCES CITED

The following references are of record in the file of this patent:

UNITED STATES PATENTS

| Number | Name | Date |
|--------|------|------|
| 982,165 | Whitney | Jan. 17, 1911 |
| 1,116,288 | Bouche | Nov. 3, 1914 |
| 1,630,369 | Bethel | May 31, 1927 |
| 1,715,840 | Janette | June 4, 1929 |

FOREIGN PATENTS

| Number | Country | Date |
|--------|---------|------|
| 20,213 | Great Britain | 1907 |